(12) United States Patent
Rowe

(10) Patent No.: US 8,787,630 B2
(45) Date of Patent: *Jul. 22, 2014

(54) MULTISPECTRAL BARCODE IMAGING

(75) Inventor: Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 737 days.

This patent is subject to a terminal disclaimer.

(21) Appl. No.: 12/985,161

(22) Filed: Jan. 5, 2011

(65) Prior Publication Data

US 2011/0165911 A1   Jul. 7, 2011

Related U.S. Application Data

(63) Continuation-in-part of application No. 12/815,196, filed on Jun. 14, 2010, now Pat. No. 8,184,873, which is a continuation of application No. 11/458,607, filed on Jul. 19, 2006, now Pat. No. 7,751,594, which is a continuation-in-part of application No. 11/115,100, filed on Apr. 25, 2005, now Pat. No. 7,460,696, and a continuation-in-part of application No. 11/115,101, filed on Apr. 25, 2005, now Pat. No. 7,394,919, and a continuation-in-part of application No. 11/115,075, filed on Apr. 25, 2005, now Pat. No. 7,539,330.

(60) Provisional application No. 60/600,687, filed on Aug. 11, 2004.

(51) Int. Cl.
*G06K 9/00* (2006.01)
*G06K 9/20* (2006.01)

(52) U.S. Cl.
CPC .......... *G06K 9/00033* (2013.01); *G06K 9/2018* (2013.01); *G06K 9/00899* (2013.01)
USPC ........................................................ 382/124

(58) Field of Classification Search
USPC ........................................................ 382/124
See application file for complete search history.

(56) References Cited

U.S. PATENT DOCUMENTS

| | | |
|---|---|---|
| 3,508,830 A | 4/1970 | Hopkins et al. |
| 3,619,060 A | 11/1971 | Johnson |

(Continued)

FOREIGN PATENT DOCUMENTS

| | | |
|---|---|---|
| CN | 130771 A | 8/2001 |
| CN | 1402183 A1 | 3/2003 |

(Continued)

OTHER PUBLICATIONS

Rowe. "LumiGuard: A Novel Spectroscopic Sensor for Biometric Security Applications", American Chemical Society 225th National Meeting, Mar. 25, 2003, 20 pages.

(Continued)

*Primary Examiner* — John Strege
(74) *Attorney, Agent, or Firm* — Marsh Fischmann & Breyfogle LLP; Daniel J. Sherwinter

(57) ABSTRACT

A multispectral sensor is provided with an illumination source and a digital imaging system. The illumination source is disposed to provide light at multiple wavelengths to an object. The digital imaging system is disposed to receive light scattered from the object and has a digital array of light detectors and a color filter array. The color filter array has a multiple distributed filter elements, each of which is adapted to transmit light of one of a limited number of specified narrowband wavelength ranges. The color filter array is disposed to filter the light scattered from the object prior to encountering the digital array of light detectors.

21 Claims, 2 Drawing Sheets

(56) References Cited

U.S. PATENT DOCUMENTS

| | | |
|---|---|---|
| 3,854,319 A | 12/1974 | Burroughs et al. |
| 3,872,443 A | 3/1975 | Ott |
| 3,910,701 A | 10/1975 | Henderson et al. |
| RE29,008 E | 10/1976 | Ott |
| 4,035,083 A | 7/1977 | Woodriff et al. |
| 4,142,797 A | 3/1979 | Astheimer |
| 4,169,676 A | 10/1979 | Kaiser |
| 4,170,987 A | 10/1979 | Anselmo et al. |
| 4,260,220 A | 4/1981 | Whitehead |
| 4,322,163 A | 3/1982 | Schiller |
| 4,427,889 A | 1/1984 | Muller |
| 4,537,484 A | 8/1985 | Fowler et al. |
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,937,764 A | 6/1990 | Komatsu et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,055,658 A | 10/1991 | Cockburn |
| 5,068,536 A | 11/1991 | Rosenthal |
| 5,070,874 A | 12/1991 | Barnes et al. |
| 5,077,803 A | 12/1991 | Kato et al. |
| 5,088,817 A | 2/1992 | Igaki et al. |
| 5,109,428 A | 4/1992 | Igaki et al. |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,335,288 A | 8/1994 | Faulkner |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,096 A | 5/1995 | Hart |
| 5,413,098 A | 5/1995 | Benaron |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,729,619 A | 3/1998 | Puma |
| 5,737,439 A | 4/1998 | Lapsley et al. |
| 5,743,262 A | 4/1998 | Lepper, Jr. et al. |
| 5,747,806 A | 5/1998 | Khalil et al. |
| 5,750,994 A | 5/1998 | Schlager |
| 5,751,835 A | 5/1998 | Topping et al. |
| 5,751,836 A | 5/1998 | Wildes et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladnev et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,859,420 A | 1/1999 | Borza |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Andersen et al. |
| 5,935,062 A | 8/1999 | Messerschmidt et al. |
| 5,945,676 A | 8/1999 | Khalil et al. |
| 5,949,543 A | 9/1999 | Bleier et al. |
| 5,957,841 A | 9/1999 | Maruo et al. |

(56) References Cited

U.S. PATENT DOCUMENTS

| | | | |
|---|---|---|---|
| 5,961,449 A | 10/1999 | Toida et al. |
| 5,963,319 A | 10/1999 | Jarvis et al. |
| 5,978,495 A | 11/1999 | Thomopoulos et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fateley |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,081,612 A | 6/2000 | Gutkowicz-Krusin et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,193,153 B1 | 2/2001 | Lambert |
| 6,208,749 B1 | 3/2001 | Gutkowicz-Krusin et al. |
| 6,212,424 B1 | 4/2001 | Robinson |
| 6,226,541 B1 | 5/2001 | Eppstein et al. |
| 6,229,908 B1 | 5/2001 | Edmonds, III et al. |
| 6,230,034 B1 | 5/2001 | Messerschmidt et al. |
| 6,236,047 B1 | 5/2001 | Malin et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 | 9/2001 | Brownlee |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,597,945 B2 | 7/2003 | Marksteiner |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,749,115 B2 | 6/2004 | Gressel et al. |
| 6,799,275 B1 | 9/2004 | Bjorn |
| 6,799,726 B2 | 10/2004 | Stockhammer |
| 6,816,605 B2 | 11/2004 | Rowe et al. |
| 6,825,930 B2 | 11/2004 | Cronin et al. |
| 6,853,444 B2 | 2/2005 | Haddad |
| 6,898,299 B1 | 5/2005 | Brooks |
| 6,928,181 B2 | 8/2005 | Brooks |
| 6,937,885 B1 | 8/2005 | Lewis et al. |
| 6,958,194 B1 | 10/2005 | Hopper et al. |
| 6,995,384 B2 | 2/2006 | Lee et al. |
| 7,047,419 B2 | 5/2006 | Black |
| 7,084,415 B2 | 8/2006 | Iwai |
| 7,147,153 B2 | 12/2006 | Rowe et al. |
| 7,254,255 B2 | 8/2007 | Dennis |
| 7,263,213 B2 | 8/2007 | Rowe |
| 7,287,013 B2 | 10/2007 | Schneider et al. |
| 7,347,365 B2 | 3/2008 | Rowe |
| 7,366,331 B2 | 4/2008 | Higuchi |
| 7,386,152 B2 | 6/2008 | Rowe et al. |
| 7,394,919 B2 | 7/2008 | Rowe et al. |
| 7,397,943 B2 | 7/2008 | Merbach et al. |
| 7,440,597 B2 | 10/2008 | Rowe |
| 7,460,696 B2 | 12/2008 | Rowe |
| 7,508,965 B2 | 3/2009 | Rowe et al. |
| 7,515,252 B2 | 4/2009 | Hernandez |
| 7,539,330 B2 | 5/2009 | Rowe |
| 7,545,963 B2 | 6/2009 | Rowe |
| 7,627,151 B2 | 12/2009 | Rowe |
| 7,668,350 B2 | 2/2010 | Rowe |
| 7,735,729 B2 | 6/2010 | Rowe |
| 7,751,594 B2 | 7/2010 | Rowe et al. |
| 7,801,338 B2 | 9/2010 | Rowe |
| 7,801,339 B2 | 9/2010 | Sidlauskas et al. |
| 7,804,984 B2 | 9/2010 | Sidlauskas et al. |
| 7,819,311 B2 | 10/2010 | Rowe et al. |
| 7,831,072 B2 | 11/2010 | Rowe |
| 7,835,554 B2 * | 11/2010 | Rowe .......................... 382/124 |
| 7,899,217 B2 | 3/2011 | Uludag et al. |
| 7,995,808 B2 | 8/2011 | Rowe et al. |
| 2002/0009213 A1 | 1/2002 | Rowe et al. |
| 2002/0065468 A1 | 5/2002 | Utzinger et al. |
| 2002/0101566 A1 | 8/2002 | Elsner et al. |
| 2002/0111546 A1 | 8/2002 | Cook et al. |
| 2002/0138768 A1 | 9/2002 | Murakami et al. |
| 2002/0171834 A1 | 11/2002 | Rowe et al. |
| 2002/0183624 A1 | 12/2002 | Rowe et al. |
| 2003/0025897 A1 | 2/2003 | Iwai |
| 2003/0044051 A1 | 3/2003 | Fujieda |
| 2003/0078504 A1 | 4/2003 | Rowe |
| 2003/0095525 A1 | 5/2003 | Lavin et al. |
| 2003/0128867 A1 | 7/2003 | Bennett |
| 2003/0163710 A1 | 8/2003 | Ortiz et al. |
| 2003/0223621 A1 | 12/2003 | Rowe et al. |
| 2004/0003295 A1 | 1/2004 | Elderfield et al. |
| 2004/0008875 A1 | 1/2004 | Linares |
| 2004/0022421 A1 | 2/2004 | Endoh et al. |
| 2004/0042642 A1 | 3/2004 | Bolle et al. |
| 2004/0047493 A1 | 3/2004 | Rowe et al. |
| 2004/0068394 A1 | 4/2004 | Maekawa et al. |
| 2004/0114783 A1 | 6/2004 | Spycher et al. |
| 2004/0120553 A1 | 6/2004 | Stobbe |
| 2004/0125994 A1 | 7/2004 | Engels et al. |
| 2004/0179722 A1 | 9/2004 | Moritoki et al. |
| 2004/0240712 A1 | 12/2004 | Rowe et al. |
| 2004/0240713 A1 | 12/2004 | Hata |
| 2004/0264742 A1 | 12/2004 | Zhang et al. |

(56) References Cited

U.S. PATENT DOCUMENTS

| | | |
|---|---|---|
| 2005/0007582 A1 | 1/2005 | Villers et al. |
| 2005/0125339 A1 | 6/2005 | Tidwell et al. |
| 2005/0169504 A1 | 8/2005 | Black |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1 | 12/2005 | Rowe et al. |
| 2005/0265607 A1 | 12/2005 | Chang |
| 2005/0271258 A1 | 12/2005 | Rowe |
| 2006/0002597 A1 | 1/2006 | Rowe |
| 2006/0002598 A1 | 1/2006 | Rowe et al. |
| 2006/0045330 A1 | 3/2006 | Marion |
| 2006/0062438 A1 | 3/2006 | Rowe |
| 2006/0110015 A1 | 5/2006 | Rowe |
| 2006/0115128 A1 | 6/2006 | Mainguet |
| 2006/0171571 A1 | 8/2006 | Chan et al. |
| 2006/0173256 A1 | 8/2006 | Ridder et al. |
| 2006/0202028 A1 | 9/2006 | Rowe et al. |
| 2006/0210120 A1 | 9/2006 | Rowe et al. |
| 2006/0244947 A1 | 11/2006 | Rowe |
| 2006/0274921 A1 | 12/2006 | Rowe |
| 2007/0014437 A1 | 1/2007 | Sato |
| 2007/0030475 A1 | 2/2007 | Rowe et al. |
| 2007/0052827 A1 | 3/2007 | Hiltunen |
| 2007/0116331 A1 | 5/2007 | Rowe et al. |
| 2007/0153258 A1 | 7/2007 | Hernandez |
| 2007/0165903 A1 | 7/2007 | Munro et al. |
| 2008/0008359 A1 | 1/2008 | Beenau et al. |
| 2008/0013806 A1 | 1/2008 | Hamid |
| 2008/0025579 A1 | 1/2008 | Sidlauskas et al. |
| 2008/0025580 A1 | 1/2008 | Sidlauskas et al. |
| 2008/0192988 A1 | 8/2008 | Uludag et al. |
| 2008/0232653 A1 | 9/2008 | Rowe |
| 2008/0260211 A1 | 10/2008 | Bennett et al. |
| 2008/0298649 A1 | 12/2008 | Ennis et al. |
| 2009/0046903 A1 | 2/2009 | Corcoran et al. |
| 2009/0080709 A1 | 3/2009 | Rowe et al. |
| 2009/0092290 A1 | 4/2009 | Rowe |
| 2009/0148005 A1 | 6/2009 | Rowe |
| 2009/0245591 A1 | 10/2009 | Rowe et al. |
| 2010/0067748 A1 | 3/2010 | Rowe |
| 2010/0246902 A1 | 9/2010 | Rowe et al. |
| 2011/0085708 A1 | 4/2011 | Martin et al. |
| 2011/0211055 A1 | 9/2011 | Martin et al. |
| 2011/0235872 A1 | 9/2011 | Rowe et al. |

FOREIGN PATENT DOCUMENTS

| | | |
|---|---|---|
| CN | 1509454 A1 | 6/2004 |
| DE | 10153808 A1 | 5/2003 |
| EP | 0280418 A1 | 8/1988 |
| EP | 0317121 B1 | 5/1989 |
| EP | 0372748 A2 | 6/1990 |
| EP | 0426358 B1 | 5/1991 |
| EP | 0449335 A2 | 10/1991 |
| EP | 0573137 A2 | 12/1993 |
| EP | 0631137 A2 | 12/1994 |
| EP | 0670143 A1 | 9/1995 |
| EP | 0681166 A1 | 11/1995 |
| EP | 0757243 A1 | 2/1997 |
| EP | 0788000 A2 | 8/1997 |
| EP | 0801297 A1 | 10/1997 |
| EP | 0836083 A1 | 4/1998 |
| EP | 0843986 A2 | 5/1998 |
| EP | 0869348 A2 | 10/1998 |
| EP | 0897164 A2 | 2/1999 |
| EP | 0897691 A2 | 2/1999 |
| EP | 0924656 A2 | 6/1999 |
| EP | 0982583 A1 | 3/2000 |
| EP | 0990945 A1 | 4/2000 |
| EP | 1353292 A1 | 10/2003 |
| EP | 1434162 A2 | 6/2004 |
| FR | 2761180 A1 | 9/1998 |
| JP | 61182174 A | 8/1986 |
| JP | 03-016160 A | 1/1991 |
| JP | 7075629 A | 3/1995 |
| JP | 10-127585 A | 5/1998 |
| JP | 2001033381 A | 2/2001 |
| JP | 2001-112742 A | 4/2001 |
| JP | 2001-184490 A | 7/2001 |
| JP | 2002-133402 A2 | 5/2002 |
| JP | 2002-517835 A | 6/2002 |
| JP | 2003-050993 A | 2/2003 |
| JP | 2003-511101 A | 3/2003 |
| JP | 2003-308520 A | 10/2003 |
| WO | 92/00513 A1 | 1/1992 |
| WO | 92/17765 A1 | 10/1992 |
| WO | 93/00855 A1 | 1/1993 |
| WO | 93/07801 A1 | 4/1993 |
| WO | 99/27848 A1 | 6/1999 |
| WO | 00/30530 A1 | 6/2000 |
| WO | 00/46739 A1 | 8/2000 |
| WO | 01/15596 A1 | 3/2001 |
| WO | 01/18332 A1 | 3/2001 |
| WO | 01/20538 A1 | 3/2001 |
| WO | 01/27882 A2 | 4/2001 |
| WO | 01/52180 A1 | 7/2001 |
| WO | 01/52726 A1 | 7/2001 |
| WO | 01/53805 A1 | 7/2001 |
| WO | 01/65471 A1 | 9/2001 |
| WO | 0169520 A2 | 9/2001 |
| WO | 02/054337 A1 | 7/2002 |
| WO | 02/084605 A2 | 10/2002 |
| WO | 02/099393 A2 | 12/2002 |
| WO | 03/010510 A2 | 2/2003 |
| WO | 03/096272 A1 | 11/2003 |
| WO | 2004/068388 A2 | 8/2004 |
| WO | 2004/068394 A1 | 8/2004 |
| WO | 2004/090786 A2 | 10/2004 |
| WO | 2006/049394 A1 | 5/2006 |
| WO | 2006/077446 A2 | 7/2006 |
| WO | 2006/093508 A2 | 9/2006 |

OTHER PUBLICATIONS

Rowe, R.K. Nixon, K.A. and Butler, P.W., "Multispectral Fingerprint Image Acquisition", Advances in Biometrics, SpringerLink Oct. 6, 2006 [retrieved Jun. 22, 2010] Retrieved from the internet. <URL: http://www.lumidigm.com/download/Multispectral-Fingerprint-Image-Acquisition.pdf.> Entire document, especially: p. 4, para 2; p. 6, para 2 and Fig. 2; p. 7, para 3 and Fig. 3; p. 8, para 2; p. 9, para 5 and Fig 4; p. 10, para 4; p. 18 para 1.

Anderson, C.E. et al. "Fundamentals of Calibration Transfer Through Procrustes Analysis," Appln, Spectros., vol. 53, No. 10 (1999) p. 1268-1276.

Ashbourn, Julian, Biometrics; Advanced Identity Verification, Springer, 2000, pp. 63-64.

Bantle, John P. et al., "Glucose Measurement in Patients With Diabetes Mellitus With Dermal Interstitial Fluid," Mosby-Year Book, Inc., 9 pages, 1997.

Berkoben, Michael S. et al., "Vascular Access for Hemodialysis," Clinical Dialysis, Third Edition, pp. 2 cover pages and 26-45, 1995.

Blank, T.B. et al., "Transfer of Near-Infrared Multivariate Calibrations Without Standards," Anal. Chem., vol. 68 (1996) p. 2987.

Bleyer, Anthony J. et al., "The Costs of Hospitalizations Due to Hemodialysis Access Management," Nephrology News & Issues, pp. 19, 20 and 22, Jan. 1995.

Brasunas, John C. et al., "Uniform Time-Sampling Fourier Transform Spectroscopy," Applied Optics, vol. 36, No. 10, Apr. 1, 1997, pp. 2206-2222.

Brault, James W., "New Approach to High-Precision Fourier Transform Spectrometer Design," Applied Optics, vol. 35, No. 16, Jun. 1, 1996, pp. 2891-2896.

Brochure entitled "Improve the Clinical Outcome of Every Patient", In Line Diagnostics, published on or before Oct. 30, 1997, 2 pages.

Cassarly, W.J. et al. "Distributed Lighting Systems: Uniform Light Delivery," Source Unknown, pp. 1698-1702, 1996.

Chang, Chong-Min et al., "A Uniform Rectangular Illuminating Optical System for Liquid Crystal Light Valve Projectors," Euro Display '96 (1996) pp. 257-260.

(56) References Cited

OTHER PUBLICATIONS

Coyne, Lawrence J. et. al., "Distributive Fiber Optic couplers Using Rectangular Lightguides as Mixing Elements," (Information Gatekeepers, Inc. Brookline, MA, 1979) pp. 160-164.
Daugirdas, JT et al. "Comparison of Methods to Predict the Equilibrated Kt/V (eKt/V) in The Hemo Study," National Institutes of Health, pp. 1-28, Aug. 20, 1996.
de Noord, Onno E., "Multivariate Calibration Standardization," Chemometrics and Intelligent Laboratory Systems 25, (1994) pp. 85-97.
Demos, S.G. et al., "Optical Fingerprinting Using Polarisation Contrast Improvement," Electronics Letters, vol. 33, No. 7, pp. 582-584, Mar. 27, 1997.
Depner, Thomas a. et al., "Clinical Measurement of Blood Flow in Hemodialysis Access Fistulae and Grafts by Ultrasound Dilution," Division of Nephrology, University of California, pp. M745-M748, published on or before Oct. 30, 1997.
Despain, Alvin M. et al., "A Large-Aperture Field-Widened Interferometer-Spectrometer for Airglow Studies", Aspen International Conference on Fourier Spectroscopy, 1970, pp. 293-300.
Faber, Nicolaas, "Multivariate Sensitivity for the Interpretation of the Effect of Spectral Pretreatment Methods on Near-Infrared Calibration Model Predictions", Analytical Chemistry, vol. 71, No. 3, Feb. 1, 1999, pp. 557-565.
Fresenius USA, "Determination of Delivered Therapy Through Measurement of Effective Clearance," 2 pages, Dec. 1994.
Geladi, Paul et al., A Multivariate NIR Study of Skin Alterations in Diabetic Patients as Compared to Control Subjects. Near Infrared Spectrosc., vol. 8 (2000) pp. 217-227.
Hakim, Raymond M. et al., Effects of Dose of Dialysis on Morbidity and Mortality, American Journal of Kidney Diseases, vol. 23, No. 5, pp. 661-669, May 1994.
Jacobs, Paul et al., "A Disposable Urea Sensor for Continuous Monitoring of Hemodialysis Efficiency", ASAIO Journal, pp. M353-M358, 1993.
Keshaviah, Prakash R. et al., "On-Line Monitoring of the Delivery of the Hemodialysis Prescription", Pediatric Nephrology, vol. 9, pp. S2-S8, 1995.
Krivitski, Nikolai M., "Theory and Validation of Access Flow Measurement by Dilution Technique During Hemodialysis", Kidney International, vol. 48, pp. 244-250, 1995.
Lee et al., "Fingerprint Recognition Using Principal Gabor Basis Function", Proceedings of 2001 International Symposium on Intelligent Multimedia, Video and Speech Processing, May 2-4, 2001, Sections 2-3.
Maltoni et al., "Handbook of Fingerprint Recognition", 2005, pp. 58-61.
Marbach, Ralf, "Measurement Techniques for IR Spectroscopic Blood Glucose Determination", Fortschritt Bericht, Series 8: Measurement and Control Technology, No. 346, pp. cover and 1-158, Mar. 28, 1994.
Mardia K.V. et al., "Chapter 11—Discriminant Analysis", Multivariate Analysis, pp. 2 cover pages and 300-325, 1979.

Nichols, Michael G. et al., "Design and Testing of a White-Light, Steady-State Diffuse Reflectance Spectrometer for Determination of Optical Properties of Highly Scattering Systems", Applied Optics, vol. 36, No. 1, pp. 93-104, Jan. 1, 1997.
Nixon, Kristin A. et al., "Novel Spectroscopy-Based Technology for Biometric and Liveness Verification", Technology for Human Identification. Proceedings od SPIE, vol. 5404, No. 1, XP-002458441, Apr. 12-13, 2004, pp. 287-295 (ISSN: 0277-786x).
Pan et al., "Face Recognition in Hyperspectral Images", IEEE Transactions on Pattern Analysis and Machine Intelligence vol. 25, No. 12, Dec. 2003.
Ripley, B. D., "Chapter 3—Linear Discriminant Analysis", Pattern Recognition and Neural Networks, pp. 3 cover pages and 91-120, 1996.
Ronco, C. et al., "On-Line Urea Monitoring: A Further Step Towards Adequate Dialysis Prescription and Delivery", The International Journal of Artificial Organs, vol. 18, No. 9, pp. 534-543, 1995.
Ross et al., "A Hybrid Fingerprint Matcher", Pattern Recognition 36, The Journal of the Pattern Recognition Society, 2003 Elsevier Science Ltd., pp. 1661-1673.
Selvaraj et al., Fingerprint Verification Using Wavelet Transform, Proceedings of the Fifth International Conference on Computational Intelligence and Multimedia Applications, IEEE, 2003.
Service, F. John et al., "Dermal Interstitial Glucose as an Indicator of Ambient Glycemia", Diabetes Care, vol. 20, No. 9, 8 pages, Aug. 1997.
Sherman, Richard A., "Chapter 4—Recirculation in the Hemodialysis Access", Principles and Practice of Dialysis, pp. 2 cover pages and 38-46, 1994.
Sherman, Richard A., "The Measurement of Dialysis Access Recirculation", American Journal of Kidney Diseases, vol. 22, No. 4, pp. 616-621, Oct. 1993.
Steuer, Robert R. et al., "A New Optical Technique for Monitoring Hematocrit and Circulating Blood Volume: Its Application in Renal Dialysis", Dialysis & Transplantation, vol. 22, No. 5, pp. 260-265, May 1993.
Webb, Paul, "Temperatures of Skin, Subcutaneous Tissue, Muscle and Core in Resting Men in Cold, Comfortable and Hot Conditions", European Journal of Applied Physiology, vol. 64, pp. 471-476, 1992.
Zavala, Albert et al., "Using Fingerprint Measures to Predict Other Anthropometric Variables", Human Factors, vol. 17, No. 6, pp. 591-602, 1975.
Chinese Patent Application No. 2006/80038579.4, First Office Action mailed on Mar. 23, 2011, 7 pages.
European Patent Application No. 10166537.0, Extended European Search Report mailed on Jun. 1, 2011, 7 pages.
International Search Report and Written Opinion of PCT/US2008/066585 mailed on Oct. 30, 2008, 10 pages.
International Search Report and Written Opinion of PCT/US2010/025463 mailed on Jun. 30, 2010, 12 pages.
International Search Report of PCT/US2010/046852 mailed on Dec. 29, 2010, 5 pages.
Rowe, et al. "Multispectral Fingerprint Image Acquisition", Advances in Biometrics, 2008, 22 pages.

* cited by examiner

MULTISPECTRAL BARCODE IMAGING

CROSS-REFERENCES TO RELATED APPLICATIONS

This application is a continuation-in-part of U.S. patent application Ser. No. 12/815,196, entitled "WHITE-LIGHT SPECTRAL BIOMETRIC SENSORS," filed Jun. 14, 2010 by Robert K. Rowe et al., which is a continuation of U.S. patent application Ser. No. 11/458,607, entitled "WHITE-LIGHT SPECTRAL BIOMETRIC SENSORS," filed Jul. 19, 2006 by Robert K. Rowe et al. ("the '607 application"; U.S. Pat. No. 7,751,594). The '607 application is a continuation-in-part of U.S. patent application Ser. No. 11/115,100, entitled "MULTISPECTRAL IMAGING BIOMETRICS," filed Apr. 25, 2005 by Robert K. Rowe (U.S. Pat. No. 7,460,696), which claims the benefit of the filing date of U.S. Prov. Pat. Appl. No. 60/600,687, entitled "MULTISPECTRAL IMAGING BIOMETRIC," filed Aug. 11, 2004. The '607 application is also a continuation-in-part of U.S. patent application Ser. No. 11/115,101, entitled "MULTISPECTRAL IMAGING BIOMETRIC," filed Apr. 25, 2005 by Robert K. Rowe (U.S. Pat. No. 7,394,919), which claims the benefit of the filing date of U.S. Prov. Pat. Appl. No. 60/600,687, entitled "MULTISPECTRAL IMAGING BIOMETRIC," filed Aug. 11, 2004. The '607 application is also a continuation-in-part of U.S. patent application Ser. No. 11/115,075, entitled "MULTISPECTRAL LIVENESS DETERMINATION," filed Apr. 25, 2005 by Robert K. Rowe (U.S. Pat. No. 7,539,330), which claims the benefit of the filing date of U.S. Prov. Pat. Appl. No. 60/600,687, entitled "MULTISPECTRAL IMAGING BIOMETRIC," filed Aug. 11, 2004 The entire disclosure of each of the aforementioned patent applications is hereby incorporated by reference for all purposes.

STATEMENT AS TO RIGHTS TO INVENTIONS MADE UNDER FEDERALLY SPONSORED RESEARCH OR DEVELOPMENT

The Government of the United States may have rights in this invention.

This application is also related to the following applications, each of which is incorporated herein by reference for all purposes: U.S. patent application Ser. No. 11/219,006, entitled "COMPARATIVE TEXTURE ANALYSIS OF TISSUE FOR BIOMETRIC SPOOF DETECTION," filed Sep. 1, 2005 by Robert K. Rowe (U.S. Pat. No. 7,668,350); "U.S. patent application Ser. No. 10/818,698, entitled "MULTISPECTRAL BIOMETRIC SENSOR," filed Apr. 5, 2004 by Robert K. Rowe et al. (U.S. Pat. No. 7,147,153); U.S. patent application Ser. No. 09/874,740, entitled "APPARATUS AND METHOD OF BIOMETRIC DETERMINATION USING SPECIALIZED OPTICAL SPECTROSCOPY SYSTEM," filed Jun. 5, 2001 by Robert K. Rowe et al.; U.S. Pray. Pat. Appl. No. 60/659,024, entitled "MULTISPECTRAL IMAGING OF THE FINGER FOR BIOMETRICS," filed Mar. 4, 2005 by Robert K. Rowe et al.; U.S. Prov. Pat. Appl. No. 60/654,354, entitled "SYSTEMS AND METHODS FOR MULTISPECTRAL FINGERPRINT SENSING," filed Feb. 18, 2005 by Robert K. Rowe; U.S. Prov. Pat. Appl. No. 60/610,802, entitled "FINGERPRINT SPOOF DETECTION USING MULTISPECTRAL IMAGING," filed Sep. 17, 2004 by Robert K. Rowe; U.S. Prov. Pat. Appl. No. 60/576,364, entitled "MULTISPECTRAL FINGER RECOGNITION," filed Jun. 1, 2004 by Robert K. Rowe and Stephen P. Corcoran; U.S. Prov. Pat. Appl. No. 60/552,662, entitled "OPTICAL SKIN SENSOR FOR BIOMETRICS," filed Mar. 10, 2004 by Robert K. Rowe; U.S. Prov. Pat. Appl. No. 60/504,594, entitled "HYPERSPECTRAL FINGERPRINTING," filed Sep. 18, 2003 by Robert K. Rowe et al.; U.S. Prov. Pat. Appl. No. 60/483,281, entitled "HYPERSPECTRAL FINGERPRINT READER," filed Jun. 27, 2003 by Robert K. Rowe et al.; and U.S. Prov. Pat. Appl. No. 60/460,247, entitled "NONINVASIVE ALCOHOL MONITOR," filed Apr. 4, 2003 by Robert K. Rowe and Robert M. Harbour.

BACKGROUND OF THE INVENTION

This application relates generally to biometrics. More specifically, this application relates to methods and systems for performing biometric measurements with a multispectral imaging sensor.

"Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure the physical features or behavioral characteristics of a person and compare those features to similar prerecorded measurements to determine whether there is a match. Physical features that are commonly used for biometric identification include faces, irises, hand geometry, vein structure, and fingerprint patterns, which is the most prevalent of all biometric-identification features. Current methods for analyzing collected fingerprints include optical, capacitive, radio-frequency, thermal, ultrasonic, and several other less common techniques.

Most of the fingerprint-collection methods rely on measuring characteristics of the skin at or very near the surface of a finger. In particular, optical fingerprint readers typically rely on the presence or absence of a difference in the index of refraction between the sensor platen and the finger placed on it. When an air-filled valley of the fingerprint is above a particular location of the platen, total internal reflectance ("TIR") occurs in the platen because of the air-platen index difference. Alternatively, if skin of the proper index of refraction is in optical contact with the platen, then the TIR at this location is "frustrated," allowing light to traverse the platen-skin interface. A map of the differences in TIR across the region where the finger is touching the platen forms the basis for a conventional optical fingerprint reading. There are a number of optical arrangements used to detect this variation of the optical interface in both bright-field and dark-field optical arrangements. Commonly, a single, quasimonochromatic beam of light is used to perform this TIR-based measurement.

There also exists non-TIR optical fingerprint sensors. In most cases, these sensors rely on some arrangement of quasi-monochromatic light to illuminate the front, sides, or back of a fingertip, causing the light to diffuse through the skin. The fingerprint image is formed due to the differences in light transmission across the skin-platen boundary for the ridge and valleys. The difference in optical transmission are due to changes in the Fresnel reflection characteristics due to the presence or absence of any intermediate air gap in the valleys, as known to one of familiarity in the art.

Optical fingerprint readers are particularly susceptible to image quality problems due to non-ideal conditions. If the skin is overly dry, the index match with the platen will be compromised, resulting in poor image contrast. Similarly, if the finger is very wet, the valleys may fill with water, causing an optical coupling to occur all across the fingerprint region and greatly reducing image contrast. Similar effects may occur if the pressure of the finger on the platen is too little or too great, the skin or sensor is dirty, the skin is aged and/or worn, or overly fine features are present such as may be the case for certain ethnic groups and in very young children. These effects decrease image quality and thereby decrease the overall performance of the fingerprint sensor. In some cases, commercial optical fingerprint readers incorporate a thin membrane of soft material such as silicone to help mitigate some of these effects and restore performance. As a soft material, the membrane is subject to damage, wear, and contamination, limiting the use of the sensor without maintenance.

Biometric sensors, particularly fingerprint biometric sensors, are generally prone to being defeated by various forms of spoof samples. In the case of fingerprint readers, a variety of methods are known in the art for presenting readers with a fingerprint pattern of an authorized user that is embedded in some kind of inanimate material such as paper, gelatin, epoxy, latex, and the like. Thus, even if a fingerprint reader can be considered to reliably determine the presence or absence of a matching fingerprint pattern, it is also critical to the overall system security to ensure that the matching pattern is being acquired from a genuine, living finger, which may be difficult to ascertain with many common sensors.

A common approach to making biometric sensors more robust, more secure, and less error-prone is to combine sources of biometric signals using an approach sometimes referred to in the art as using "dual," "combinatoric," "layered," "fused," or "multifactor biometric sensing. To provide enhanced security in this way, biometric technologies are combined in such a way that different technologies measure the same portion of the body at the same time and are resistant to being defeated by using different samples or techniques to defeat the different sensors that are combined. When technologies are combined in a way that they view the same part of the body they are referred to as being "tightly coupled."

There is accordingly a general need in the art for improved methods and systems for biometric sensing.

BRIEF SUMMARY OF THE INVENTION

Embodiments of the invention provide a multispectral sensor that comprises an illumination source and a digital imaging system. The illumination source is disposed to provide light at a plurality of wavelengths to an object. The digital imaging system is disposed to receive light scattered from the object and comprises a digital array of light detectors and a color filter array. The color filter array has a plurality of distributed filter elements, each of which is adapted to transmit light of one of a limited number of specified narrowband wavelength ranges. The color filter array is disposed to filter the light scattered from the object prior to encountering the digital array of light detectors.

The multispectral sensor may function as a biometric sensor when the object comprises a skin site of an individual, and may be configured to detect blanching or blood pooling at the skin site as part of a spoof detection. In some instances, the filter elements are distributed according to a Bayer pattern. In some embodiments, a first polarizer may be disposed to polarize the light provided by the illumination source, with the digital imaging system further comprising a second polarizer disposed to polarize the light scattered from the object. The first and second polarizers may advantageously be provided in a crossed configuration.

The multispectral sensor may be incorporated within a portable electronic device and have such functionality as an ability to read a bar code, an ability to scan printed matter, an ability to securely receive data related to functionality changes of the portable electronic device, and the like. In other instances, the multispectral sensor may be configured for use as a smart switch, configured for use as a pointing device, configured for use a text entry device, configured for measuring an ambient light condition, and the like. In some embodiments, the multispectral sensor is integrated with a separate biometric sensor.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

DETAILED DESCRIPTION OF THE INVENTION

1. Overview

Embodiments of the invention provide methods and systems that allow for the collection and processing of biometric measurements. These biometric measurements may provide strong assurance of a person's identity, as well as of the authenticity of the biometric sample being taken, and may be incorporated within a number of different types of devices, such as cellular telephones, personal digital assistants, laptop computers, and other portable electronic devices. In some embodiments, a sensor provides light that penetrates the surface of an individual's skin, and scatters within the skin and/or underlying tissue. Skin sites applicable to multispectral imaging and biometric determination include all surfaces and all joints of the fingers and thumbs, the fingernails and nail beds, the palms, the backs of the hands, the wrists and forearms, the face, the eyes, the ears, and all other external surfaces of the body. While the discussion below sometimes makes reference to "fingers," it should be understood that this refers merely to exemplary embodiments and that other embodiments may use skin sites at other body parts.

A portion of the light scattered by the skin and/or underlying tissue exits the skin and is used to form a multispectral image of the structure of the tissue at and below the surface of the skin. As used herein, the term "multispectral" is intended to be construed broadly as referring to methods and systems that use multiple wavelengths, and thus includes imaging systems that are "hyperspectral" or "ultraspectral" as those terms are understood by those of skill in the art. Because of the wavelength-dependent properties of the skin, the image formed from each wavelength of light is usually different from images formed at other wavelengths. Accordingly, embodiments of the invention collect images from each of the wavelengths of light in such a way that characteristic spectral and spatial information may be extracted by an algorithm applied to the resulting multispectral image data.

Figure 1:
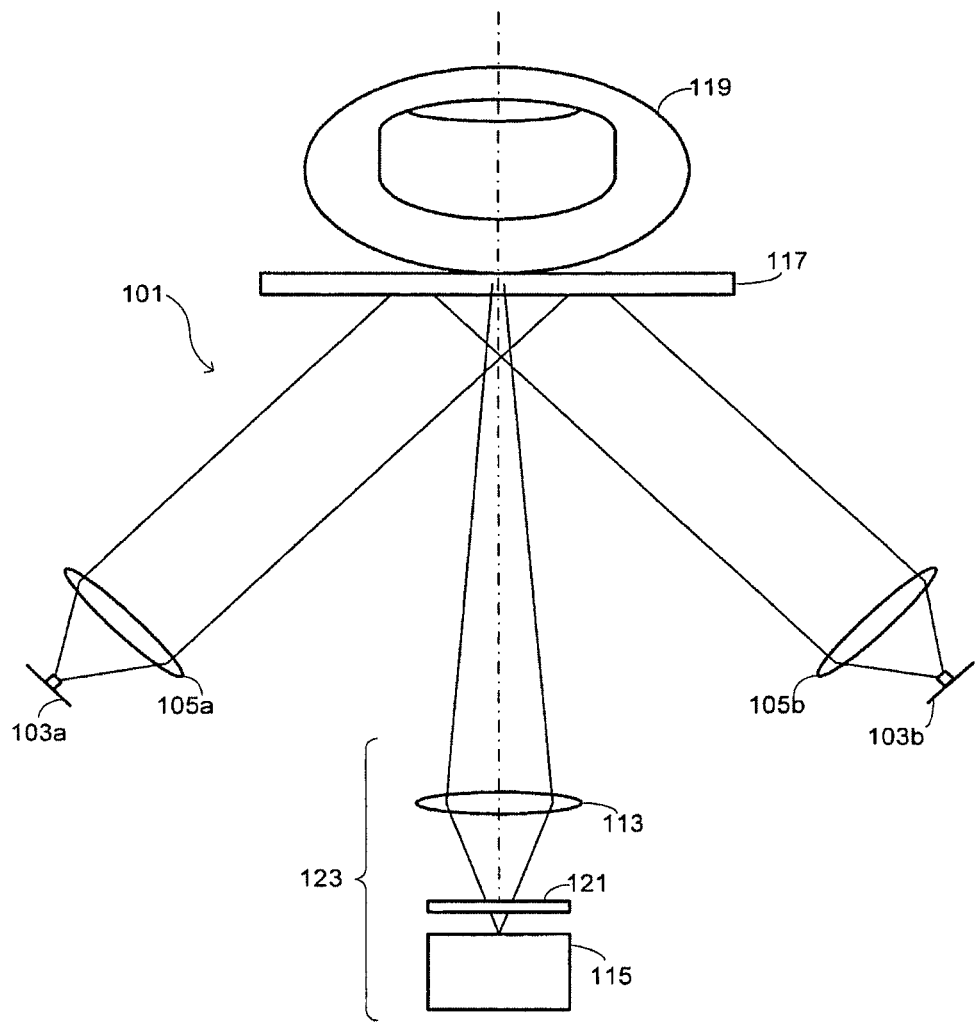
FIG. 1 provides a front view of a multispectral biometric sensor in one embodiment of the invention.

Embodiments of the invention provide for multispectral imaging of tissue using a digital imaging system. An illustration of a simplified arrangement is shown in FIG. 1, which shows one embodiment for a multispectral biometric sensor

101. The multispectral sensor 101 comprises one or more sources of light 103 and a digital imaging system 123. The number of illumination sources may conveniently be selected to achieve certain levels of illumination, to meet packaging requirements, and to meet other structural constraints of the multispectral biometric sensor 101. Illumination passes from the source 103 through illumination optics that shape the illumination to a desired form, such as in the form of flood light, light lines, light points, and the like. The illumination optics 105 are shown for convenience as consisting of a lens but may more generally include any combination of one or more lenses, one or more mirrors, and/or other optical elements. The illumination optics 105 may also comprise a scanner mechanism (not shown) to scan the illumination light in a specified one-dimensional or two-dimensional pattern. The light source 103 may comprise a point source, a line source, an area source, or may comprise a series of such sources in different embodiments.

After the light passes through the illumination optics 105, it passes through a platen 117 and illuminates the finger 119 or other skin site so that reflected light is directed to a digital imaging system 123. The digital imaging system 123 generally comprises a digital array 115 and detection optics 113 adapted to focus the light reflected from the object onto the array. For example, the detection optics 113 may comprise a lens, a mirror, a pinhole, combination of such optical elements, or other optical elements known to those of skill in the art. The digital imaging system 123 also comprises a color filter array 121, which may in some instances be incorporated as part of the digital array 115. The color filter array 121 may comprise a red-green-blue filter array in the well-known Bayer pattern or in other patterns. In some instances, the filter elements may function to transmit wavelengths that differ from the standard red-green-blue wavelengths, may include additional wavelengths, and/or may be arranged in a pattern that differs from the Bayer pattern. In instances where such a color filter array 121 is included, the illumination source(s) 103 may be a white-light or broadband source. Alternatively, the illumination source(s) 103 may comprise a plurality of narrowband sources, such as LEDs, with central wavelengths that are within the pass bands of filter elements comprised by the color filter array 121.

The sensor layout and components may advantageously be selected to minimize the direct reflection of the illumination into the digital imaging system 123. In one embodiment, such direct reflections are reduced by relatively orienting the illumination and detection optics such that the amount of directly reflected light detected is minimized. For instance, optical axes of the illumination optics 105 and the detection optics 113 may be placed at angles such that a mirror placed on the platen 117 does not direct an appreciable amount of illumination light into the detection subsystem 123. In addition, the optical axes of the illumination and detection optics may be placed at angles relative to the platen 117 such that the angular acceptance of both subsystems is less than the critical angle of the system; such a configuration avoids appreciable effects due to total internal reflectance between the platen 117 and the skin site 119.

The specific characteristics of the optical components comprised by the multispectral sensor 101 may be implemented to configure the multispectral sensor 101 for different form factors. For example, in an embodiment where the multispectral sensor is implemented in the top of a gear shift as part of a system to verify the identify of a driver of a vehicle, the light sources 103 and digital array 115 might not fit within the gear-shift handle as constructed. In such an embodiment, an optical relay system may be implemented. For example, relay optics that comprise individual lenses similar to those in a bore scope may be used, or alternatively optical fibers such as used in orthoscopes may be used. Still other techniques for implementing an optical relay system will be evident to those of skill in the art. In this way, components of the sensor may be located remotely from the sampling surface.

The multispectral sensor may take multiple images and combine them for processing. For example, one image may be made with one or more illumination wavelengths present and be followed immediately by an image taken with no illumination turned on. The difference between these two images allows the effect of illumination to be separated from background illumination. The difference image may then be used for further processing according to other aspects of the invention.

Figure 2:
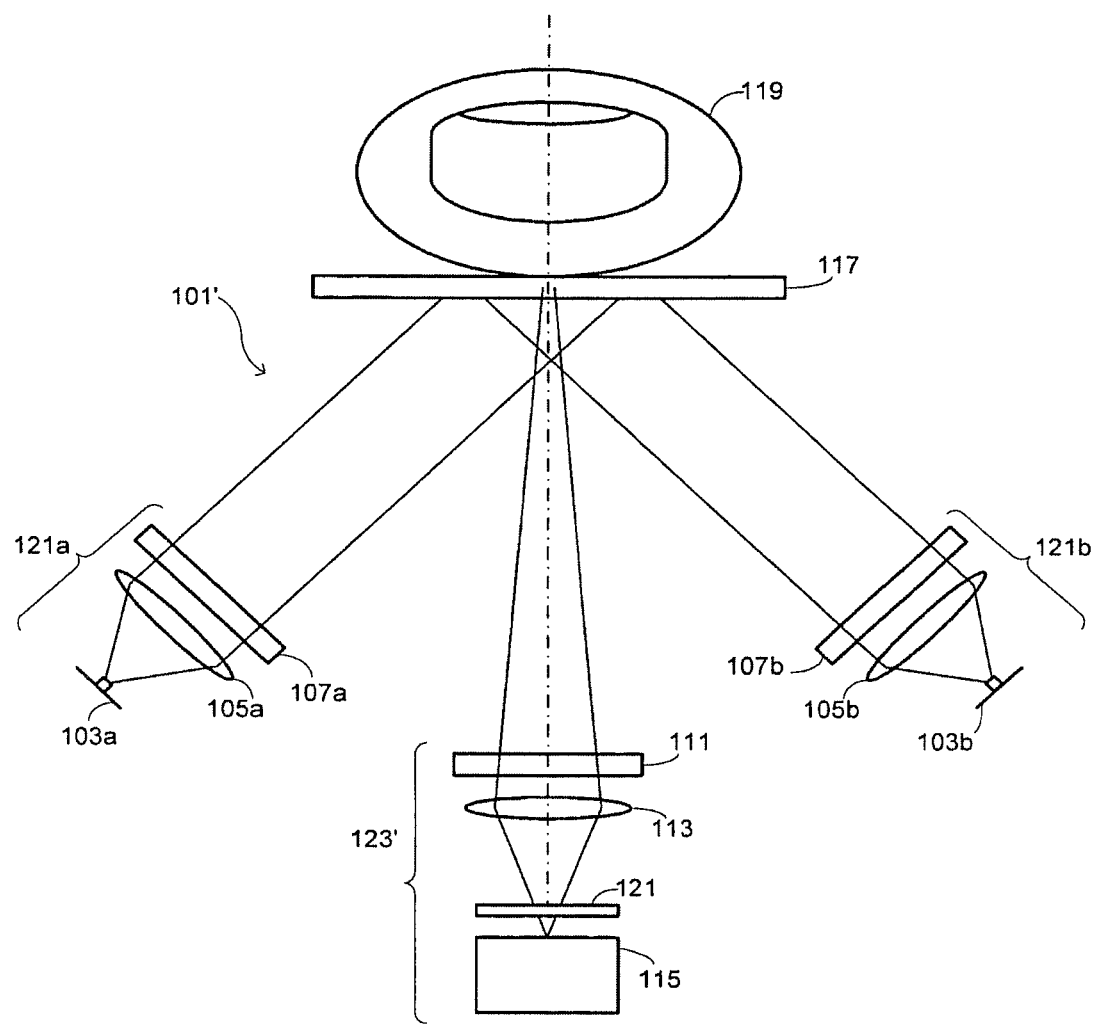
FIG. 2 provides a front view of a multispectral biometric sensor shown in another embodiment.

In some embodiments, the multispectral sensor uses optical polarizers. One example of such an embodiment is provided in FIG. 2. The basic structure of the sensor 101' is similar to that of FIG. 1, but polarizers 107 have been added to the illumination system(s) 121 and a polarizer 111 has been added to the digital imaging system. The polarizers 107 and 111 may be linear or circular, or a combination of the two. In the case of linear polarizers, one useful arrangement is that in which the illumination light is polarized along a particular axis while the detected light requires an orthogonal polarization. Such an arrangement has utility in ensuring that detected light has undergone multiple scatter events in a medium such as skin. Further utility is derived from the observation that such an arrangement greatly reduces the visibility of latent prints left on the platen 117 by previous users, thus providing improved image quality and reducing the likelihood of spoofing by "reactivating" the latent prints. The utility of the arrangement also extends to conventional optical fingerprint readers as well as multispectral imagers. In particular, dark-field optical fingerprint systems are well-suited for the addition of linear polarizers in such an arrangement. Further discussion of a multispectral finger-recognition sensor that uses such a crossed-polarizer arrangement is described in copending, commonly assigned U.S. Prov. Pat. Appl. No. 60/576,364, entitled "MULTISPECTRAL FINGER RECOGNITION," filed Jun. 1, 2004 by Robert K. Rowe and Stephen P. Corcoran, the entire disclosure of which is incorporated herein by reference for all purposes.

2. Applications

In a number of specific embodiments, A multispectral imaging sensor may be incorporated in a cellular telephone, a personal digital assistant, a laptop computer, or other portable electronic device. Such a multispectral sensor may be configured to collect multispectral biometric data on a finger. The sensor may require that a person touch the sensor, or may be able to collect the necessary multispectral data in a noncontact fashion with appropriate images being collected while the skin is located at a distance from the sensor.

In some embodiments, the multispectral imaging sensor incorporated in a portable electronic device may contain an optical system to enable adjustable focus. The mechanism for adjusting the may include one or more lenses that may be moved into various positions. The focusing mechanism itself may be a conventional zoom arrangement. Alternatively, the mechanism for focusing may use a liquid lens based on the known phenomenon of electro-wetting.

In a system configuration in which the portable electronic device has been designed to accommodate a "close-up" or macro image of the finger for biometric sensing, the same optical system may be used to read an optical code such as a barcode. Such a barcode reading could, for example, initiate a service in which product information for a product corresponding to the UPC barcode is downloaded to the portable device to provide the consumer with comparative pricing and performance data. Similar barcode scans may be used in other embodiments for promotional games or various gaming activities. The conjunction of a barcode scan taken in close temporal proximity to a biometric scan could provide for an audit trail for legal matters, including financial documents and transactions, forensic chain-of-evidence scenarios, and a variety of logical and/or physical security applications.

An imaging system on a portable electronic device that is configured to collect multispectral biometric data may also be used to scan in text, graphics, or other printed matter. In the case of text, the scanned data may be converted to an interpretable form using known optical-character-recognition ("OCR") techniques. Such text recognition may then be used to provide input of text-translation services, copying services, and other such services that may be aided by a rapid and convenient character input.

An imaging system on a portable electronic device may also be used as an optical input device to provide a mechanism for securely inputting data into the device for functions such as reprogramming, security overrides, and secure digital communications. The illumination components of the imaging system may be used as optical output devices in the reverse direction from the detector elements. The use of multiple, filtered wavelengths can provide proved for multiple high-bandwidth channels for rapid and/or robust optical communication.

The multispectral sensor may also be used as a smart switch to turn on or enable an associated device, system, or service. In such a capacity, the multispectral sensor may be set to a video-streaming mode to collect several frames per second. Each frame may then be analyzed to detect motion and, if motion is detected, perform image processing steps to confirm that the motion is due to a finger by analyzing the overall shape, the texture, and/or the spectral qualities relative to a living finger.

The multispectral sensor may be used as a pointing device with similar functionality as a touchpad commonly used on a laptop PC. The multispectral sensor can be used in this fashion by monitoring the motion of the finger over the sensing area. Sliding the finger in a linear motion to the left can indicate a leftward motion to the PC (or cell phone, PDA, or other device), with similar effects for motions to the right, up, down, diagonal, or other directions. The cursor of the PC (or cell phone, PDA, or other device) may then be made to move in the indicated direction, or other appropriate action may be taken. In a similar fashion, the surface of the sensor may be tapped in different regions to simulate a click or double-click of a conventional PC mouse. Other motions, such as circles, X's, and the like, may be used to indicate other specific actions. In the case of touching or tapping the sensor, the degree of pressure may be estimated by evaluating the degree of blanching occurring in the finger. In this manner, different actions may be taken in response to a soft pressure being sensed relative to a hard pressure.

The spectral qualities of the finger in motion may be assessed to ensure that the detected motion is from that of a finger rather than some spurious object. In this way, false motions can be avoided.

The sensor surface may also be used as a simple text entry device. In a similar fashion as in the case of a pointing device, the user may make motions with the fingertip that describe single letters or number, which are then accumulated by the portable electronic device.

A particular motion of the finger may be used to increase the security of the sensing system. In such a configuration, the spectral and spatial qualities of the finger are confirmed to match those that are on record while the particular finger motion that is made is assessed to ensure it is similar to the motion on record. In this way, both the finger qualities and the motion need to match in order to determine an overall match.

The multispectral sensor may be used to measure the ambient light condition. In order to do so, an image is taken without any illumination light turned on at a time when a finger is not covering the sensor surface. The amount of ambient light may be determined from the image. Further details about ambient lighting may be derived in the case where the imager uses a color filter array or a similar mechanism to assess spectral characteristics of the light. The measure levels of ambient light may then be used by the associated device to set levels for display brightness, backlighting, etc. Such settings are particularly useful in ensuring the usability of portable electronic devices while conserving battery usage.

3. Combinations of Multispectral Sensing with Other Biometric Sensors

A small and rugged embodiment of a multispectral sensor may be constructed from solid-state components such as silicon digital imaging arrays and light-emitting diodes. Such a sensor may be integrated into a conventional fingerprint sensor to provide a second biometric reading when a fingerprint is taken. The conventional fingerprint sensor may be an optical fingerprint sensor. The multispectral sensor may use one or more illumination wavelengths to sense optical characteristics of the skin, including the presence, degree, and/or distribution of blood in the finger or other body part. The illumination wavelength(s) may include one or more wavelengths shorter than approximately 600 nm, where blood is known to become highly optically absorbing and thus discernible from other tissue components.

The images taken by the multispectral sensor prior to the finger touching the sensor may be used in whole or in part to perform a biometric assessment of the person's identity. In the case of a fingerprint, the individual ridge lines may be identified and tracked through a series of images to quantify the degree and type of distortion that such ridge images undergo when pressure is applied to the sensor by the finger.

The fingerprint pattern observed by the multispectral imager using one or more illumination wavelengths may be combined with the TIR pattern to provide a combinatoric biometric. The multispectral image may contain information on the external friction ridge pattern, the internal friction ridge pattern, the composition and position of other subsurface structures, the spectral qualities of the finger, the size and shape of the finger, and other features that are somewhat distinct from person to person. In this way, one or more multispectral features may be combined with the optical fingerprint data to provided additional biometric information.

In some cases, the multispectral imaging data may be processed to improve the quality of the TIR fingerprint. In particular, there may be a linear or nonlinear numerical relationship established on parts of the image where both the multispectral image data and TIR data are well defined. These parts are then used to establish a mathematical model such as with Principal Component Regression, Partial Least Squares, Neural Networks, or other methods to one familiar in the art. The parts of the TIR image that are missing due to poor contact, etc. can thus be estimated from the model so established. In another embodiment, the entire images may be used, but the numerical model built using robust statistics in which the relationship is relatively unaffected by missing or degraded portions of the TIR image. Alternatively, numerical models may be established through the examination of previously collected TIR/multispectral image sets and then applied to new data.

4. Spoof Detection

The multispectral sensor may be used to make a determination about the authenticity of the sample and thereby detect attempts to spoof the optical fingerprint sensor. The multispectral sensor may be able to make a static spectral reading of the sample either when it touches the sensor surface or at a remote distance to ensure that the spectral qualities match those of a living finger.

The multispectral sensor may also use one or more illumination wavelengths to illuminate the finger as it moves to touch the sensor surface. During this interval of time, blanching of the skin may be observed in the vicinity of the sensor as pressure is applied by the finger. As well, areas of the skin may show a distinct pooling of blood, especially those regions at the perimeter of the area of contact between the finger and sensor. This blanching and/or pooling of the skin provides an identifiable set of changes to the corresponding images. In particular, wavelengths less than approximately 600 nm, which are highly absorbed by the blood, are seen to get brighter in the region of blanching and darker in areas of blood pooling. Wavelengths longer than approximately 600 nm are seen to change much less during blanching and/or pooling. The presence, magnitude, and/or relative amounts of spectral changes that occur while the finger touches the fingerprint sensor can be used as an additional means of discriminating between genuine measurements and attempts to spoof the sensor.

In the case where the multispectral sensor is combined with an optical TIR fingerprint reader, the pattern detected by the multispectral sensor using one or more illumination wavelengths may be compared with the pattern detected by the fingerprint sensor and consistency confirmed. In this way, the internal fingerprint data due to blood and other subsurface structures is used to confirm the image of the external fingerprint that the conventional fingerprint sensor collects. If there is a discrepancy between the two patterns, an attempt to spoof the fingerprint sensor using a thin, transparent film placed on the finger may be indicated. Appropriate action may be taken in response to this discrepancy to ensure that such a spoof attempt is not being perpetrated.

Other factors that can be monitored to discriminate between genuine finger and attempts to spoof the detector using an artificial or altered sample of some kind include monitoring the image taken with 1 or more wavelengths over time. During the specified time interval, changes such as those due to pulse can be measured and used to confirm a genuine finger. As well, changes in the image due to sweating at the ridge pores can be observed and used for spoof detection.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A sensor comprising:
    an illumination source disposed to provide light to an object; and
    an imaging system disposed to receive light scattered from the object substantially without total internal reflectance (TIR) effects,
    wherein:
        the imaging system is configured to perform a biometric analysis of the object when the object comprises a skin site of an individual; and
        the imaging system is configured to read a barcode from the object when the object comprises the barcode.

2. The sensor recited in claim 1 wherein:
    the illumination source provides light to the object at a plurality of wavelengths; and
    the biometric analysis comprises a multispectral biometric analysis.

3. The sensor recited in claim 2 wherein the imagining system comprises:
    an array of light detectors; and
    a color filter array having a plurality of distributed filter elements, each filter element being adapted to transmit light of one of a limited number of specified narrowband wavelength ranges, the color filter array being disposed to filter the light scattered from the object prior to encountering the array of light detectors.

4. The sensor recited in claim 3 wherein the filter elements are distributed according to a Bayer pattern.

5. The sensor recited in claim 1 further comprising:
    a first polarizer disposed to polarize the light provided by the illumination source; and
    a second polarized disposed to polarize the light scattered from the object.

6. The sensor recited in claim 1 wherein the first and second polarizers are in a substantially crossed configuration.

7. The sensor recited in claim 1 wherein the imaging system is further configured to initiate a service in response to reading the barcode.

8. The sensor recited in claim 1 wherein the imaging system is further configured to generate an audit trail for the object in response to reading the barcode.

9. The sensor recited in claim 1 wherein the imaging system is configured to scan printed matter from the object when the object comprises the printed matter.

10. The sensor recited in claim 1 wherein:
    the printed matter comprises text; and
    the imaging system is further configured to convert the scanned printed matter to an interpretable form using optical-character-recognition techniques.

11. The sensor recited in claim 1 wherein:
    the illumination source is comprised by an illumination system; and
    the illumination system is configured to generate an image in response to receiving light scattered from the object.

12. The sensor recited in claim 1 wherein the imaging system comprises a focusing mechanism providing an adjustable focus to image the object.

13. A portable electronic device comprising the sensor recited in claim 1.

14. The portable electronic device recited in claim 13 wherein the portable electronic device comprises a cellular telephone.

15. A method comprising:
    illuminating an object with light, the object comprising a barcode;
    receiving light scattered from the object substantially without total internal reflectance (TIR) effects;
    reading the barcode from the object with the received light scattered from the object;
    illuminating a skin site of an individual with light;
    receiving light scattered from the skin site; and
    performing a biometric analysis of the skin site from the received light scattered from the skin site.

16. The method recited in claim 15 wherein:
- illuminating the skin site of the individual comprises illuminating the skin site of the individual at a plurality of wavelengths; and
- performing the biometric analysis comprises performing a multispectral biometric analysis of the skin site.

17. The method recited in claim 15 further comprising initiating a service in response to reading the barcode.

18. The method recited in claim 15 wherein illuminating the skin of the individual and illuminating the object with light are perform in close temporal proximity.

19. The method recited in claim 15 further comprising generating an audit trail for the object in response to reading the barcode.

20. The method recited in claim 15 further comprising:
- illuminating a second object with light, the second object comprising printed matter;
- receiving light scattered from the second object; and
- generating an image of the printed matter from the second object with the received light scattered from the second object.

21. The method recited in claim 20 wherein the printed matter comprises text, the method further comprising converted the image of the printed matter to an interpretable form using optical-character-recognition techniques.

* * * * *